L. J. STERN.
DISTANCE INDICATOR.
APPLICATION FILED DEC. 4, 1917.

1,311,253. Patented July 29, 1919.

Inventor,
Louis J. Stern
by
B. J. Noyes Atty

UNITED STATES PATENT OFFICE.

LOUIS J. STERN, OF BOSTON, MASSACHUSETTS.

DISTANCE-INDICATOR.

1,311,253.  Specification of Letters Patent.  Patented July 29, 1919.

Application filed December 4, 1917.  Serial No. 205,440.

*To all whom it may concern:*

Be it known that I, LOUIS J. STERN, a citizen of the United States, and a resident of Boston, county of Suffolk, and State of Massachusetts, have invented an Improvement in Distance-Indicators, of which the following is a specification.

My invention relates to means for measuring the distance between two objects, and has especial reference to means for measuring the distance between two automobiles or other vehicles.

It is very desirable for the driver of an automobile or other vehicle to know of the presence of an automobile in the rear of his own car and to also know how far in the rear the second automobile is, in order that he may properly and safely maneuver his car.

Automobiles are commonly equipped with mirrors by means of which the driver of a car so equipped may easily observe to the rear of his car, and so observe the possible presence of an oncoming automobile or other vehicle.

While the mirror with which the car is equipped, and by means of which the driver may see to the rear, gives an approximate indication of the distance between the two cars by the comparative size of the image of the car in the mirror; yet this approximation is exceedingly inaccurate, and, moreover, is misleading.

There are two types of mirrors commonly employed for the purpose of permitting the driver to observe to the rear of his car; namely, the plane mirror and the reducing mirror. These mirrors are usually made of rather small size, in order that they may be inconspicuous when attached to the car.

With the plane mirror the field of vision is so restricted that whereas the entire oncoming automobile may be visible in the mirror when the automobile is at a comparatively great distance to the rear of the car to which the mirror is attached; yet when the oncoming automobile is comparatively close to the car only a part of the car is visible in the mirror, and the remainder of the car extends beyond the field of vision of the mirror. As it is by comparing the relative variation of size of the image of a known dimension of the car, such, for instance, as the distance between the forward wheels of the car, that the driver may approximately estimate the distance the oncoming car is to the rear; the presentation of but a partial image of the car in the plane mirror serves to entirely destroy his means of measurement, and therefore he is unable to estimate in any satisfactory manner the distance which the rear car is from his car.

Because of this defect of the plane mirror, the reducing mirror has, to a large extent, supplanted the plane mirror for the purpose of providing a rearward view. The reducing mirror, as is well known, comprises a reflecting surface formed of a section of a sphere. While the entire image of the oncoming car is at all times visible in the reducing mirror, even at close and dangerous distances to the car to which the mirror is attached; yet the image is so reduced in size that it is exceedingly difficult to form an accurate estimation of the intervening distance between the two cars.

It is exceedingly desirable that some means be provided whereby the driver of an automobile may observe to the rear of the automobile and may, at the same time, and with sufficient accuracy, estimate the distance between his car and an approaching vehicle; and, consequently, the object of my invention is to provide means fulfilling such requirements.

The means whereby I accomplish the object of my invention is in the provision of a mirror by which the driver of the car may observe to the rear of his car; which mirror is provided with suitable markings, or distance indications thereon, so placed that the position of the image of the oncoming car in the mirror with respect to the markings or indications thereon, gives a sufficiently accurate indication of the intervening distance between the two cars, or the distance from the mirror to the foremost portion of the approaching vehicle.

Figure 1:
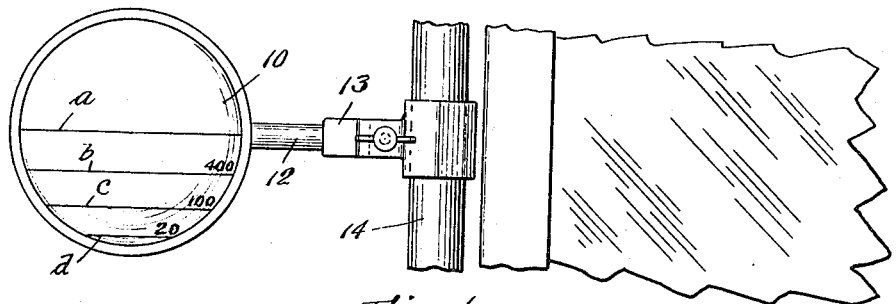
Figure 1 is an elevation of a mirror embodying my invention, as attached to the wind shield of an automobile.
Figure 2:
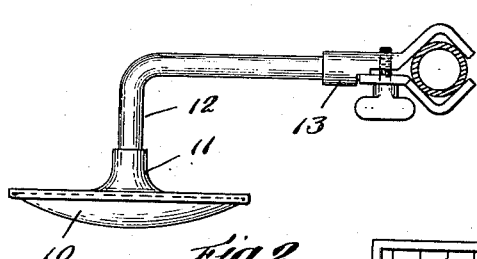
Fig. 2 is a plan view of the mirror and supporting bracket.

As here shown, a preferred embodiment of my invention includes the mirror 10 having a spherical or reducing reflecting surface, and secured in the frame 11. Said frame 11 with the mirror 10 is secured to an end of the rod 12 having a right angled bend therein, the other end of which terminates in a clamp 13, by means of which the mirror may be secured to the post 14 of the wind shield of the automobile. Said rod 12 forms means whereby the mirror may be extended laterally beyond the automobile to enable an unobstructed rearward view to be obtained, and to also support the mirror so that the horizontal axis of the mirror is parallel to the surface of the road.

The surface of the mirror is provided with a horizontal line or graduation $a$, which may be considered a base line and which extends across the center of the mirror and represents the trace on the mirror surface of a plane parallel with the road surface and passing through the center of the sphere, of which the reflecting surface of the mirror 10 forms a section. The surface of the mirror 10 below the horizontal line or graduation $a$, which may serve to divide the reflecting surface of the mirror into two substantially equal portions, is provided with a suitable number of similar lines or graduations $b$, $c$, and $d$, extended across its surface and parallel to the central horizontal and base line $a$, and represent the intersection of planes parallel to the plane forming line $a$ with the reflecting surface of the mirror 10. Said lines $b$, $c$ and $d$ may be suitably marked, as indicated, to represent the distance that the foremost part of the oncoming car is to the mirror; or they may be marked to indicate a safe or an unsafe distance that the rear car is to the car to which the mirror is attached.

For the practical and accurate use of the mirror provided with the lines and graduations shown in Fig. 1, the mirror is secured to the wind shield or other support of the automobile in such a way that the horizontal axis of the mirror, lying in the plane of which the base line $a$, is a trace, is parallel to the surface of the road or way upon which the automobile is positioned; and at such a height that the eyes of the driver are in said horizontal plane of the mirror.

When such an adjustment of the mirror with relation to the road surface and to the eyes of the driver is made, then the distance to which the lowest part of the image in the mirror, and in the case of an automobile, the point of contact of the front wheels with the road, appears to be below the base line $a$, is a measure of the distance between the foremost part of the rear car and the mirror; the height to which the image of the car in the mirror appears above the base line $a$, is designed to serve no useful purpose in indicating the intervening distance between the cars.

Figure 5:
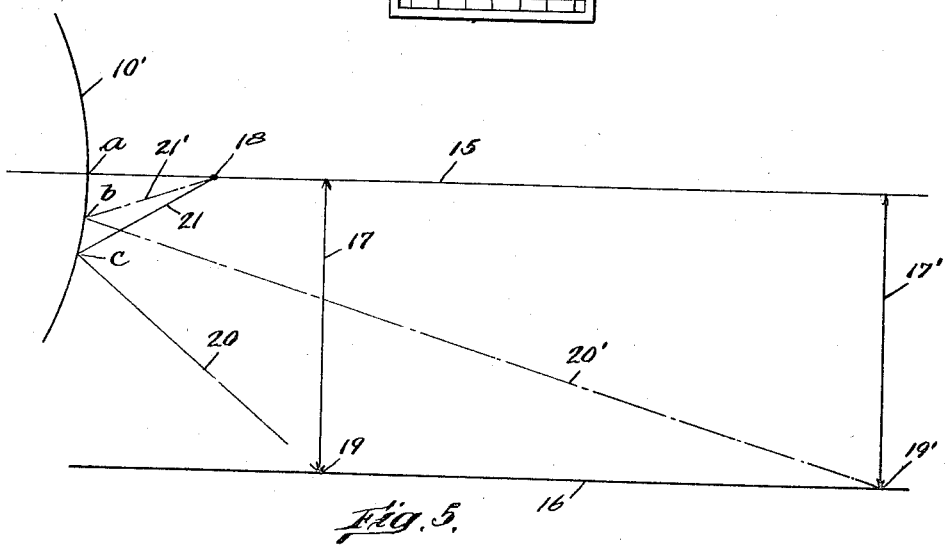
Fig. 5 is a diagram illustrating the principle of my invention as applied to a reducing mirror.

The manner in which the lines or graduations $b$, $c$, and $d$ are placed upon the surface of the mirror to indicate the distance that the car or object is from the mirror, is indicated in Fig. 5, which represents diagrammatically, and not to any scale, the method of obtaining the graduations or lines upon the surface of the mirror. As shown in Fig. 5, $10'$ represents the surface of a reducing mirror of known curvature. The horizontal plane of the mirror is represented by line 15 which cuts the reflecting surface of the mirror at the point $a$. The horizontal plane of the mirror 15 is arranged to be parallel with the surface of the road bed 16. The line 17 represents a vertical plane passing through the front wheels of an automobile at the point of contact of the wheels with the ground. The eye of the observer is located at 18 in the horizontal plane 15 of the mirror, but at one side of the vertical plane of the mirror. Inasmuch as the eye is in the horizontal plane of the mirror, which plane is indicated on the mirror by the horizontal base line $a$, the height of that part of the car of which the image appears below the horizontal line $a$ is always equal to the distance that the center of the mirror is from the ground, regardless of the distance of the car from the mirror, inasmuch as the horizontal plane of the mirror is parallel to the plane of the ground. Therefore, the intersection of line $a$ on the mirror with the image of the oncoming car serves to indicate a point on the car a fixed distance above the surface of the ground; and as this distance may be known, being equal to the height of the mirror 10 above the surface of the ground, and as the size of the image in the reducing mirror varies in proportion to the distance the image is from the car, it is seen that the distance to which the image is below the horizontal base line $a$ in the mirror is at all times a measure of the distance the car is to the rear of the mirror.

In the diagram of Fig. 5, the point 19 indicates the contact of the front wheels of the rear vehicle with the roadway indicated by the line 16, and the incident ray 20 from the point 19 strikes the reflecting surface 10 of the mirror at the point $c$, and is reflected along the line 21 to the eye at 18. Therefore, the distance between the point $a$ and the point $c$ is a measure of the distance between the reflecting surface of the mirror and the plane 17 passing through the front wheels of the vehicle.

If the vehicle is removed from the mirror to a point indicated by line $17'$, then the ray $20'$ from the point $19'$ strikes the mirror at some point $b$ and is reflected along line $21'$ to the eye of the observer at 18, and the distance between $a$ and the point $b$ is a measure of the distance between the reflected surface of the mirror and the new position of the vehicle. It is thereby seen that the horizontal lines b, c, d, when the axis of the mirror is parallel to the roadway and the eye of the observer is in the horizontal plane of the mirror, form an accurate measure of the distance between the rear car and the mirror.

Although the points b and c, derived as indicated in the diagram shown in Fig. 5 are on the vertical plane of the mirror, yet the rear vehicle may be at any point to one side or other of the vertical axis of the mirror; and the point b or c, or the corresponding point of intersection of the front wheels of the vehicle with the road, will correspondingly be moved along a straight line parallel to base line a to one side or the other of the vertical axis of the mirror. It is to be noted that the distance to the object reflected in the mirror may be calculated by multiplying the length of the image in the mirror, as measured by the distance from base line a to any point b, by a factor or factors, which may be termed the "mirror factor," and which depends, among other things, on the radius of curvature of the mirror. When the graduations are calibrated to read directly in distance, this factor will have been employed in determining the calibrations marked on the mirror.

Figure 3:
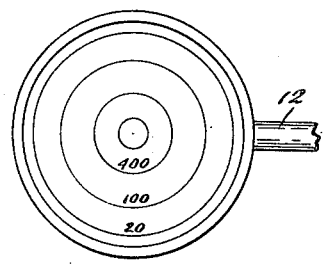
Fig. 3 is a plan view of a mirror having a modified system of graduations or distance indications.

Although the graduations just above described form an accurate measure of the intervening distance between the two cars; yet these graduations are not the only ones that may be utilized for the purpose, and in Fig. 3 is shown the surface of a mirror having a plurality of concentric circles arranged thereon, which circles may be conveniently graduated. Although the concentric circle graduations may not be so accurate as are the horizontal lines previously described, yet they form an approximate means for estimating the intervening distance between two cars.

Figure 4:
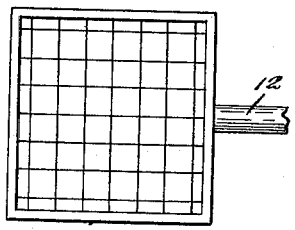
Fig. 4 is a representation of a plane mirror having graduated markings thereon.

The modification shown in Fig. 4 represents a plane mirror having a surface divided into a plurality of squares, and in this form the number of squares included in the image of the oncoming car may be a measure of the distance between the car and the mirror.

It is to be noted that, while the graduations illustrated in Fig. 1 serve to indicate the height of the image of the oncoming car, and thus form a measure of its distance from the mirror, the graduations shown in Figs. 3 and 4, in addition to the indication of the height, also indicate the breadth, or therefore, the extent of the image in the mirror and therefore distance may be measured by observing the extent of the image in the mirror, assuming the graduations thereon to be suitably marked to read in terms of distance.

I claim:—

1. A reducing mirror having a plurality of indications on its reducing surface whereby the distance to an object reflected in said mirror may be known.

2. A mirror having a plurality of parallel indications on its reflecting surface calibrated and arranged to intercept the image of an object in the mirror to make known the distance to the object.

3. A reducing mirror having a plurality of parallel lines on its reducing face, which are arranged to intercept the image of an object in the mirror to make known the distance to the object.

4. A mirror having graduations on its reflecting surface calibrated to give an indication of the distance from the mirror to an object reflected therein.

5. A mirror having indications on its reflecting surface arranged to intercept the reflection of an object in said mirror and calibrated in suitable terms to indicate the distance from said mirror to the object.

6. A mirror having a base line and distance graduations thereon suitably calibrated and arranged to indicate the distance to an object, by the extent of the image of an object in said mirror between said base line and said graduations.

7. The method of measuring distances which consists in employing a reducing mirror, intercepting a known dimension on the object to which the distance from the mirror is desired, measuring the length of the image of the intercepted dimension of the object and multiplying said length by the mirror factor, which image is a measure of the distance from the mirror to the object.

8. The method of measuring distances which consists in employing a mirror, measuring the length of the image of an object of known length reflected in said mirror, the distance to which object is desired, the length of said image being a function of the distance to the object and multiplying said length by the mirror factor.

9. The method of measuring distances which consists in employing a mirror having a base line thereon, reflecting in said mirror an object of known length, the distance to which is desired, one end of the reflected object coinciding with the base line, and measuring the length of the image of the object from said base line, which length is a function of the distance to the object.

In testimony whereof, I have signed my name to this specification, in the presence of two subscribing witnesses.

LOUIS J. STERN.

Witnesses:
T. T. GREENWOOD,
H. B. DAVIS.